B. W. ELDER.
CATALYZER FOR EFFECTING HYDROGENATION AND PROCESS OF MAKING SAME.
APPLICATION FILED JUNE 7, 1918.
1,331,903.
Patented Feb. 24, 1920.
3 SHEETS—SHEET 3.
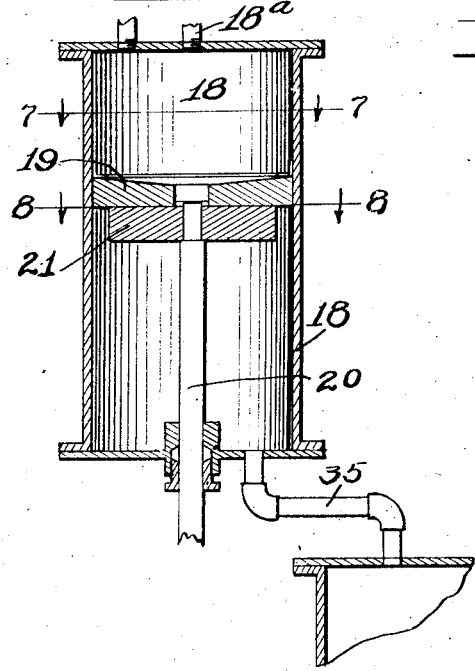
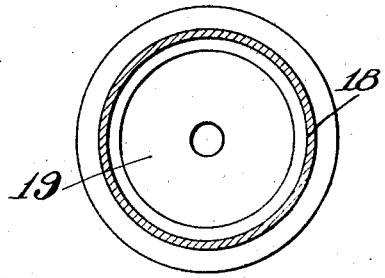
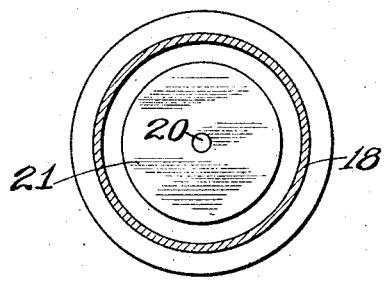
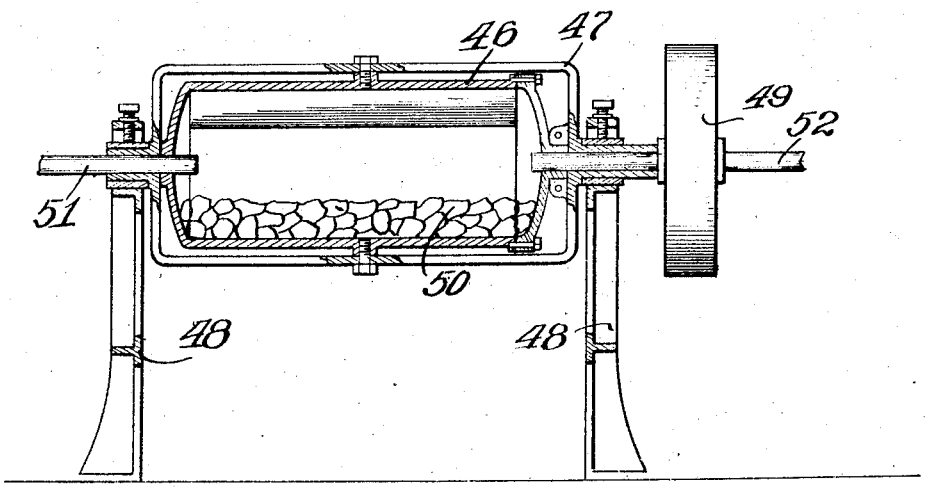

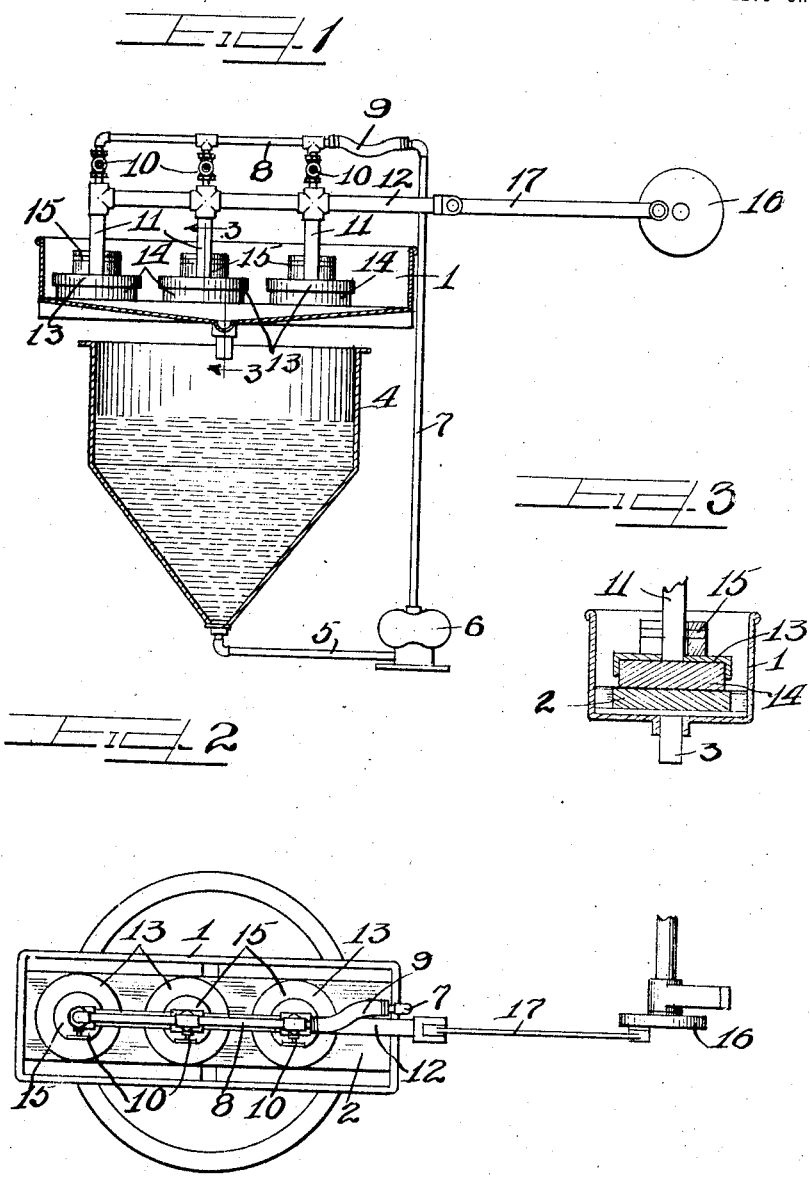

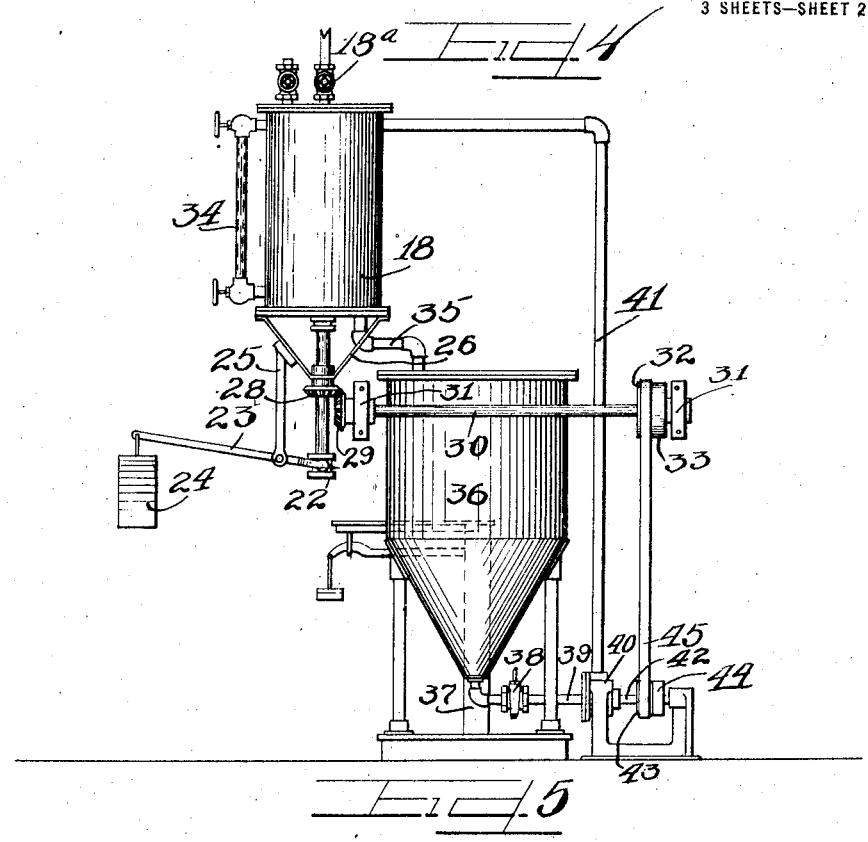
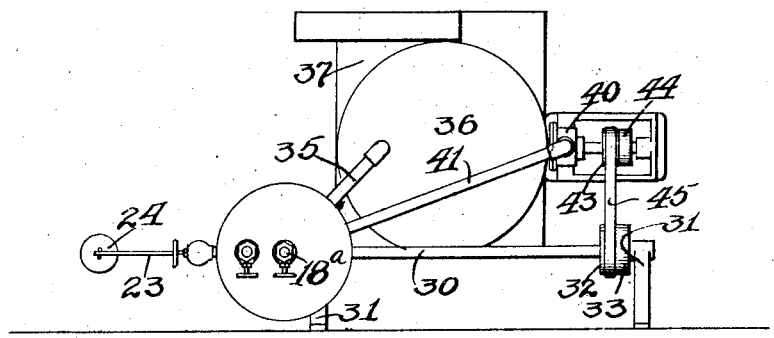

UNITED STATES PATENT OFFICE.

BENJAMIN W. ELDER, OF LOS ANGELES, CALIFORNIA, ASSIGNOR TO THE ALLBRIGHT-NELL COMPANY, A CORPORATION OF ILLINOIS.

CATALYZER FOR EFFECTING HYDROGENATION AND PROCESS OF MAKING SAME.

1,331,903.   Specification of Letters Patent.   Patented Feb. 24, 1920.

Application filed June 7, 1918. Serial No. 238,654.

*To all whom it may concern:*

Be it known that I, BENJAMIN W. ELDER, a citizen of the United States, and a resident of the city of Los Angeles, in the county of Los Angeles and State of California, have invented certain new and useful Improvements in Catalyzers for Effecting Hydrogenation and Processes of Making Same; and I do hereby declare that the following is a full, clear, and exact description of the same, reference being had to the accompanying drawings, and to the numerals of reference marked thereon, which form a part of this specification.

This invention relates to improvements in catalyzers and methods of producing the same, and more particularly to mechanically produced nickel catalyzers in a finely pulverulent state.

The invention is based upon the discovery that nickel, in bulk form, which possesses practically no catalytic activity, can be rendered highly catalytic by subjecting it, under suitable conditions, to such mechanical attrition or abrasion or comminution as will develop in the nickel, and in the resulting catalyzer, a high degree of catalytic activity.

Hydrogenation processes for the purpose of hardening or hydrogenating oil or fats, such as the unsaturated fatty acids and their glycerids, and other unsaturated bodies, depend upon a catalytic action wherein the hydrogen gas in the presence of a catalyzer is awakened from its dormant condition and enabled to combine with the unsaturated bodies. Only a limited number of metals and their compounds have been found suitable for use as catalyzing agents, and in general the metal nickel has been found to be the most practical for use.

In order to produce nickel catalyzers of satisfactory catalytic activity it has been the common practice to effect the reduction of nickel oxid or other reducible nickel compounds with hydrogen at an elevated temperature. Catalyzers thus produced are usually of an extremely pyrophoric character, and frequently lose their catalytic activity unless they are protected from contact with the air.

I have ascertained that such chemical methods of producing a nickel catalyzer are unnecessary, and that an improved catalyzer of high catalytic activity, can be directly produced from metallic nickel by subjecting it to suitable mechanical treatment; and that nickel which is inactive catalytically, or which possesses practically no catalytic activity, can thereby be converted into a nickel catalyzer of high catalytic activity.

The nickel catalyzer of the present invention is preferably and advantageously produced from raw metallic nickel, in bulk form, such as, for instance, so-called nickel shot, or nickel blocks, or grain nickel, and the like, which possesses practically no catalytic activity, and which is free from foreign constituents prejudicial to the development of the desired catalytic properties. Other forms of nickel, however, can be similarly treated, in order to convert nickel possessing little or no catalytic activity into a nickel catalyzer of high catalytic activity.

The novel catalyzer of the present invention may be produced by various methods of procedure, such as grinding or abrading the bulk nickel, or by subjecting it to attrition or other form of mechanical comminution or subdivision which will develop in the resulting nickel, the desired degree of catalytic activity. The nickel is preferably brought into such a state of mechanical subdivision that it will be in a finely-pulverulent form readily adapted to be maintained in suspension in a liquid medium, as, for instance, in the fatty acid or its ester to be hydrogenated; but as the development of the catalytically active condition of the material seems to be in part, at least, a function of the attrition or like treatment incident to the operation, it is not absolutely necessary that the material should be brought into a finely pulverulent form. It may, in fact, in some instances, have a different physical form from that of a fine powder, provided always that the mechanical treatment has been carried on under such conditions as to develop and maintain in the resulting product the proposed catalytic activity. When the nickel is brought into its finely pulverulent form, the particles should preferably and advantageously be of such a minute character and of such exceeding fineness, as to approach colloidal particles in size, and to be readily maintained in suspension in the liquid to be hydrogenated. Particles of this character, and of high catalytic activity, can be readily produced by suitable mechanical treatment of bulk nickel, according to the process of the present invention.

In general, I consider that the most advantageous method of producing the novel catalyzer of the present invention, and of developing the desired catalytic activity therein, is to subject bulk nickel to an attrition or abrasion operation, with the aid of an abrasive, and preferably, also, with the aid of a protective liquid. The catalyzer can, however, be produced by different methods of procedure, and either with or without the aid of such an abrasive, and with or without the aid of a protective liquid or a protective gas.

When the catalyzer is produced with the aid of an abrasive, in a finely-divided form, the resulting product will be a composite product containing both the finely-divided abrasive and the finely pulverulent nickel particles resulting from the abrasion. The finely-divided abrasive, when used, should be of such a character that it will not be prejudicial to the desired catalytic action of the catalyzer produced. Among the finely-divided abrasives available for use, may be mentioned silica, quartz, sand, alundum, emery, carborundum, etc., or any other abrasive which is without prejudicial effect upon the development of the catalytic activity and upon the catalyzer produced and its catalytic action. A finely pulverulent abrasive of about 200 mesh is well adapted for use in the process of the present invention.

Where the catalyzer is produced in the presence of a protective liquid, for example, oil, the minute particles of catalyzer will be picked up and enveloped by the oil and protected thereby, so that there will be produced directly a suspension of the minute particles of catalyzer in the oil vehicle. When a finely-divided abrasive is also used, both the abrasive and the nickel particles will be contained in the oil vehicle. The oil used may, with advantage, be such an oil as can be itself hydrogenated, and the catalyzer carried by the oil may be used directly for the catalytic hydrogenation of such oil; or it may be added to larger batches of oil, or otherwise employed for the catalytic hydrogenation of further amounts of oil.

Instead of using a protective liquid, a protective gas, such as hydrogen, may be advantageously used in certain cases, particularly where the mechanical treatment is carried out under conditions leading to objectionable oxidation if a protective agent is not present. In many cases no protective agent will be required to protect the nickel from objectionable oxidation by the surrounding air, but, when desired, a protective agent, either liquid or gaseous, or both, may be used.

The invention will be further described in connection with certain methods of procedure available for the production of the novel catalyzer, in a finely-divided form, and certain of these processes will be more particularly described wherein the mechanical attrition or abrasion is carried out with the aid of a protective oil which will envelop the minute particles of catalyzer, protecting them from the air and other extraneous influence, and acting as a carrier thereof.

Different types of apparatus for the production of the catalyzer are shown in the accompanying drawings, in which:

Figure 1 is a sectional elevation of one form of apparatus adapted for the production of the improved catalyzers according to the process of the present invention;

Fig. 2 is a top view thereof;

Fig. 3 is a detail section taken on the line 3—3 of Fig. 1;

Fig. 4 is a side elevation of another form of apparatus;

Fig. 5 is a top plan view thereof;

Fig. 6 is a sectional view of the upper part of the apparatus shown in Figs. 4 and 5;

Fig. 7 is a horizontal section on the line 7—7 of Fig. 6;

Fig. 8 is a horizontal section on the line 8—8 of Fig. 6; and

Fig. 9 is a longitudinal sectional elevation of another form of apparatus adapted for the production of the improved catalyzer.

Referring first to the apparatus shown in Figs. 1, 2 and 3, the vessel or container 1 has its bottom recessed to receive a block of raw metallic nickel 2. The portions of the floor of said vessel on each side of said block are inclined downwardly from the ends toward the trough at the middle, as shown in Fig. 1, said trough communicating with an outlet pipe 3.

Below the vessel 1 is the receiver or receptacle 4 having a pipe 5 leading from the bottom thereof to a pump 6, from which an outlet pipe 7 leads upwardly and is connected to a supply pipe 8 by means of a flexible hose connection 9. The supply pipe 8 is provided with a plurality of valved outlets 10 communicating through suitable fittings with pipes 11, which, at their lower ends, carry inverted cup-shaped members 13 within each of which is confined an apertured grinding or abrasive block 14, of material such as pumice, bearing upon the upper surface of the nickel block 2.

An actuating rod or bar 12 is rigidly connected at the upper ends of the pipes 11, and reciprocating motion is imparted thereto from the eccentric 16, by means of the connecting rod 17. Circular, slotted weights 15 may be placed around the pipes 11 upon the inverted cup-shaped member 13, in order to obtain any desired bearing pressure between the rubbing elements 14 and the surface of the nickel block 2. Reciprocating motion, imparted by the eccentric 16, driven in any suitable manner, causes the abrasive blocks 14 to abrade the block 2 of raw nickel with resulting production therefrom, in a finely pulverulent form, of fine nickel particles, which are catalytically active.

In the operation of the apparatus illustrated in Figs. 1–3, the protective liquid, for example, oil, is placed in the receptacle 4 and circulated by means of the pipes 5 and 7 and the pump 6, to the pipes 11, which also serve as actuating elements for the weighted rubbing or abrasive blocks 14, so that a film or stream of oil is constantly distributed through the pipes 11 and the openings in the blocks 14, over the surface of the nickel block 2, and between the abrasive blocks 14 and the nickel block 2. This oil serves to promote the rubbing or abrading action and the development of the catalytic properties in the catalyzer produced. The oil, moreover, acts as a carrier, enveloping the minute particles of the nickel resulting from the rubbing or abrasion, and protecting these from the air, as well as conveying them away from where the rubbing or attrition is taking place. The oil with its enveloped catalyzer particles will flow away from the abrasive blocks 14, during the backward and forward movement thereof, and will pass through the trough and pipe 3 to the receptacle 4. The oil with the metal particles associated therewith and enveloped thereby is again circulated from the receptacle 4, by means of the pump 6, so that further amounts of the catalyzer particles will be taken up by the oil, and the amount of catalyzer contained in the receptacle 4 will progressively increase. The particles of abrasive and of catalyzer which settle most quickly, will be most frequently re-circulated and will be subjected to further rubbing or abrading operations in their passage between the abrading blocks 14 and the abraded surfaces of the nickel block 2.

In the apparatus illustrated in Figs. 4 to 8 inclusive, the upright cylindrical receptacle 18 is provided with a hydrogen inlet 18ª and a blow-off cock at the top thereof. Rigidly mounted within the receptacle 18, as shown in Figs. 6 to 8 inclusive, is a block of nickel 19 having a central aperture therethrough. Extending upwardly through a stuffing box in the bottom wall of receptacle 18 is a shaft 20 which is capable of rotation and of longitudinal vertical movement. Mounted on the upper end of said shaft is a rubbing or abrasive block 21, which bears upwardly against the under surface of the stationary nickel block 19. The lower end of the shaft 20 is provided with a collar 22 within which is the yoked end of a lever 23 which is pivoted on the lower end of a bracket arm 25, and which carries removable weights 24 at its outer end. The bracket arm 25 is carried by bracket arms 26 which serve to support a bearing for the shaft 20. A bevel pinion 28 is slidably mounted on the shaft 20 so that longitudinal movement of the shaft may take place with respect to said pinion while the shaft is nevertheless caused to rotate therewith, for example, by means of a key carried by the pinion and working in a slot (not shown) on the shaft. The pinion 28 is driven from another pinion 29 mounted on a shaft 30 journaled in suitable bearings 31. The shaft has secured thereto tight and loose pulleys 32 and 33.

Mounted on the receptacle 18 is a gage glass 34 by means of which the level of the contents within the receptacle may be ascertained. Leading downwardly from the bottom of the receptacle is a flexible pipe connection 35 which communicates with the lower receptacle or receiver 36. Said receiver 36 is supported upon a scale 37, so that the weight of its contents may be ascertained at any time, and the density thereof readily determined. As the percentage of finely divided nickel catalyzer carried by the oil increases, the weight of the oil and contained catalyzer will correspondingly increase, and the progress of formation of the catalyzer will be thus indicated.

At the bottom of the receptacle or receiver 36 is an outlet provided with a valve 38. A flexible pipe connection 39 leads therefrom to a pump 40 from which the pipe 41 leads upwardly and communicates with the upper end of the receptacle 18. The pump is driven from a drive shaft 42 upon which the pulleys 43 and 44 are mounted. A belt 45 connects one of these pulleys with one of the pulleys 32 and 33. By means of the pump 40 the oil is circulated from the receiver 36 to the top of the receptacle 18, so that it will flow down through the opening in the nickel block 19 and between the block 21 and the abraded surface of the block 19. This oil will flow out between these surfaces and carry with it the finely divided nickel particles which it will envelop and protect from the surrounding atmosphere.

In the operation of the apparatus, the rubbing block 21 is caused to rotate and is forced upwardly under pressure against the stationary nickel block 19. The oil may itself carry finely divided abrasive which, in its passage from the opening in the block 19 downwardly between the rubbing surfaces, will further aid in the rubbing or abrasion. The pressure of the rubbing plate or block 21 may be varied by changing the number of weights 24, as will be readily understood. A constant flow of oil may be maintained by means of the pump 40, and the oil with its enveloped catalyzer particles will return to the receiver 36 which may be weighed from time to time to note the increase in weight of the contents thereof. As the minute particles of nickel catalyzer are picked up and held in suspension in the oil, the weight of the oil body in the receptacle 36 will correspondingly increase. The circulation of the oil may be continued until the desired amount of finely divided nickel has been produced, or until sufficient finely-divided nickel has accumulated in the oil to make further circulation thereof difficult. The tendency in the operation of the apparatus of Figs. 4 to 8, as well as that of Figs. 1 to 3 is for the larger particles of nickel and abrasive to settle most quickly and to be recirculated most frequently with the oil so that they will be repeatedly subjected to further rubbing or attrition between the abrasive block and the abraded nickel surface.

Instead of effecting the mechanical attrition or abrasion by means of the action of an abrasive block upon nickel surfaces, as above described, a similar result can be obtained by the action of nickel surfaces upon nickel, or by the action of nickel upon nickel with the assistance of a finely-divided abrasive. Thus, the blocks 14 of Figs. 1 and 2, and the blocks 21 of Figs. 4 to 8 may be of nickel, and the rubbing or abrasion of the nickel upon nickel promoted by a finely-divided abrasive carried by the oil which is circulated between the rubbing blocks. The resulting finely pulverulent catalyzer particles will be carried away by the oil, and will be recirculated therewith. The finely pulverulent nickel particles will thus also be subjected to further rubbing or abrasion and may even assist in the production of further amounts of finely divided catalyzer by their abrasive action upon the rubbing surfaces of the nickel blocks.

In the modified form of apparatus illustrated in Fig. 9 I have shown a tumbler or pebble mill or ball mill 46, of circular or polygonal shape, mounted in the frame 47 so as to rotate therewith. The frame is journaled in upright bearing standards 48 and is rotated by a pulley 49 secured upon an extension of the frame.

The bulk nickel, preferably grain nickel, is introduced into the tumbler through a suitable opening (not shown), or by removal of one end of the tumbler illustrated. Extending into one end of the drum through one end of the bearing frame is an inlet pipe 51, and extending into the other end thereof in a similar manner is an inlet pipe 52.

The nickel, preferably in bulk form, may be introduced into the tumbler or pebble mill, in the form of nickel shot or grain nickel or other suitable form of nickel. The nickel may be introduced either alone or together with a finely-divided abrasive, and either with or without the addition of a protective liquid such as oil, etc. Preferably both a finely-divided abrasive and a quantity of a protective liquid such as oil are introduced alone with the nickel to be abraded.

When no abrasive is used, the nickel shot or other form of nickel will, during the rotation of the tumbler, be subjected to attrition or abrasion, and the nickel will be slowly but gradually converted into finely-divided nickel particles, which, if the operation is sufficiently continued, will be found to have a high degree of catalytic activity.

The ball mill operation may be carried out at ordinary temperatures, and without extra precautions, although it is sometimes advantageous, and may even be desirable, to protect the nickel against oxidation during the operation. To this end a protective or non-oxidizing gas such as hydrogen may be introduced through the pipe 51, or a protective liquid such as oil, may be introduced through the pipe 52; or both a protective gas and a protective liquid may be present. When the protective liquid is an unsaturated oil, and the protective gas is hydrogen, some catalytic hydrogenation of the oil may be brought about during the production of the catalyzer, particularly if the temperature is raised to such a temperature as will materially promote the catalytic hydrogenation of the oil. In this case, there will result as the product of the operation a composite product comprising the finely pulverulent catalyzer either with or without the admixed abrasive in a hydrogenated oil vehicle or carrier.

When an abrasive is used, it may be added either in small amount, or in large amount, so that the action may be either that of nickel upon nickel with the assistance of the intervening abrasive, or that of the abrasive itself directly upon the nickel, where an excess of abrasive is used.

During the rotation of the tumbler or ball mill, its contents are churned around with resulting abrasion of the surfaces of the nickel and the production of small particles of nickel. When an abrasive also is present, the product will be a composite product containing the finely divided abrasive and the finely divided catalyzer particles. When an oil also is present, the resulting product will be an oil mud containing the finely divided nickel catalyzer, either with or without admixture of the finely divided abrasive.

It will be evident that varying amounts of oil or other protective liquid can be used as well as varying amounts of abrasive, and that the resulting product will correspondingly vary in its oil and abrasive content, and in its content of finely divided catalyzer particles. In general, the amount of finely divided catalyzer particles will increase with the prolongation of the ball mill operation. The fineness or minuteness of the particles produced will also tend to increase with prolongation of the operation, inasmuch as the fine particles first produced will be further subjected to the attrition or abrasive action during the continuation of the operation. The catalytic activity, moreover, seems to be further increased and developed by the prolongation of the operation.

It is readily possible, when using a finely divided abrasive, or even without such an abrasive, to produce a finely divided nickel catalyzer with particles of microscopic size and of a sufficient degree of fineness so that it can be readily maintained in suspension in liquids, for example, fatty oils, for considerable periods of time and with but slow settling out therefrom. Such a finely divided catalyzer is well adapted for use in the catalytic hydrogenation of oils and can be readily maintained in suspension therein during the catalytic operation.

In the operation of the tumbler or pebble mill, and particularly where the operation is not too slow, there will take place a combined rubbing, squeezing and percussive action, particularly well adapted to the production of the finely pulverulent catalyzer and to the development of the desired catalytic activity therein.

The improved catalyzer of the present invention is distinguished from such finely divided catalyzers as are produced by reduction with hydrogen, at elevated temperatures, of reducible nickel compounds, in that they are essentially metallic in character, when produced from metallic nickel, and in that they are characterized by the mechanical operation by which they are produced, and by the form and properties and condition imparted thereto by such mechanical operation.

It will be noted moreover, that the catalyzers of the present invention are produced by a simple operation or procedure directly from nickel having practically no catalytic activity; and with elimination of chemical methods of solution and precipitation, for converting the nickel into a reducible nickel compound, and furnace operations for reducing the reducible nickel compounds into a state of catalytic activity. The improved catalyzers of the present invention are accordingly produced by a procedure of marked simplicity which nevertheless imparts to the resulting product its catalytic properties.

Certain specimens of the catalyzer, when viewed under the microscope, showed particles in part angular in outline, rather than rounded; and some of the particles showed straight line edges indicating that the particles were produced from the original crystals existing in the nickel shot from which the catalyzer was produced.

The particles are generally dull black and do not exhibit metallic luster under the microscope, thus indicating a rough surface. The smallest particles were exceedingly small, and it was difficult to determine what their shape or outline might be.

In specimens of the catalyzer prepared with the aid of 200 mesh silica as abrasive, when viewed in oil under the microscope, the particles of quartz or silica appeared of relatively large size and the opaque nickel particles appeared smaller and tended to bunch together or arrange themselves in irregular lines and grooves. The silica appears to settle out more rapidly than the nickel owing presumably to the coarser size of its particles. It is, therefore, possible to effect a separation to a greater or less extent, of the abrasive particles from the nickel particles, as by differential sedimentation, where this difference in size exists. The finely-divided composite catalyzer nevertheless goes into suspension very easily in oil and settles out very slowly so that the catalyzer can be readily maintained in suspension for relatively long periods of time, something which is of great importance for many purposes, for example, in the catalytic hydrogenation of fatty oils.

I do not claim herein specifically the process of producing the improved catalyzer of the present invention by a ball mill operation inasmuch as this process is specifically and separately claimed in a separate application Serial No. 238655, nor do I claim herein the hydrogenation of fatty oils or other unsaturated liquids with the improved catalyzers, inasmuch as such hydrogenation processes also form the subject-matter of separate applications Serial Nos. 238656 and 238657.

The process of the present invention is applicable to the production of other finely pulverulent catalyzers as well as nickel catalyzers by subjecting other catalyzer materials, for example, other catalyzer metals, to a similar attrition or abrasion, for converting the same into a finely pulverulent form, and for developing the desired catalytic activity therein.

I claim:

1. A finely pulverulent nickel catalyzer having its catalytic activity imparted thereto by attrition of substantially non-catalytic bulk nickel.

2. A finely pulverulent nickel catalyzer produced by mechanical treatment of substantially non-catalytic bulk nickel, and of a sufficient degree of fineness to permit it to be readily maintained in suspension in liquids to be hydrogenated.

3. A finely pulverulent nickel catalyzer resulting from the abrasion of substantially non-catalytic bulk nickel, and containing a finely divided abrasive in admixture with the finely pulverulent catalyzer particles.

4. A suspension in a protective liquid of a finely pulverulent nickel catalyzer produced by mechanical treatment of substantially non-catalytic bulk nickel in the presence of such liquid.

5. A finely pulverulent nickel catalyzer admixed with a finely pulverulent abrasive and an oil, and resulting from the abrasion of substantially non-catalytic bulk nickel in the presence of the oil.

6. A finely pulverulent nickel catalyzer produced by abrasion of bulk nickel, and containing particles partaking of the crystalline character of the bulk nickel from which produced, and of such exceeding fineness as to enable them to be readily maintained in suspension in liquids for considerable periods of time.

7. A suspension in oil of a finely pulverulent nickel catalyzer produced in the oil by abrasion of bulk nickel, and containing particles partaking of the crystalline character of the bulk nickel from which produced, and of such exceeding fineness as to enable them to be readily maintained in suspension in liquids for considerable periods of time.

8. The method of producing a catalyzer which comprises subjecting substantially non-catalytic bulk nickel to attrition and thereby producing therefrom a finely pulverulent nickel catalyzer of high catalytic activity.

9. The method of producing a catalyzer, which comprises converting bulk nickel, by mechanical means, into a finely pulverulent form, in the presence of a protective liquid.

10. The method of producing a finely pulverulent nickel catalyzer in suspension in a protective liquid, which comprises converting substantially non-catalytic bulk nickel, by mechanical means, into a finely pulverulent state in the presence of a protective liquid.

11. The method of producing a catalyzer, which comprises abrading substantially non-catalytic nickel, and thereby producing an intimate mixture of the finely pulverulent catalyzer and of the abrasive.

12. The method of producing a catalyzer, which comprises subjecting a mixture of nickel and an abrasive to an abrading operation and thereby producing a composite product containing the abrasive and the finely pulverulent nickel catalyzer.

13. The method of producing a catalyzer, which comprises abrading bulk nickel with the aid of a finely divided abrasive, and thereby producing a finely pulverulent nickel catalyzer of high catalytic activity in admixture with the abrasive.

14. The method of producing a catalyzer, which comprises abrading bulk nickel to produce a finely pulverulent nickel catalyzer, and continuing the abrasion of the finely pulverulent nickel catalyzer to increase its catalytic activity.

15. The method of producing a catalyzer, which comprises abrading potentially catalytic material, with the aid of a finely divided abrasive, and thereby producing an intimate mixture of the finely pulverulent catalyzer and of the abrasive.

16. The method of producing a catalyzer which comprises subjecting bulk metal to attrition, and thereby producing therefrom a finely pulverulent metal catalyzer of high catalytic activity.

17. The method of producing a catalyzer, which comprises abrading a catalyzer material with the aid of a finely divided abrasive, and thereby producing a finely pulverulent catalyzer of high catalytic activity in admixture with the abrasive.

18. The process of forming a catalyzer by mixing an abrasive substance and a quantity of catalyzer metal in the presence of oil and imparting an abrading motion thereto.

19. The process of forming a catalyzer by obtaining small particles of catalyzer metal from the raw metal by an abrading operation in the presence of oil.

20. The process of forming a catalyzer by obtaining small particles of catalyzer metal from the raw catalyzer metal by an abrading operation on the raw metal in the presence of an enveloping fluid to exclude the metal particles from contact with air.

21. The process of forming a catalyzer by abrading a raw catalyzer metal with a finely divided abrasive in a bath of oil in the presence of hydrogen.

22. The process of forming a catalyzer by abrading a catalyzer metal in the presence of oil and hydrogen.

23. The process of forming a catalyzer by introducing oil over the surfaces of a continuously abraded catalyzer metal.

24. The process of forming a catalyzer by abrasively rubbing the raw catalyzer metal in the presence of an enveloping carrier fluid.

25. The process of forming a catalyzer by the action of an abrasive upon nickel in the presence of oil.

26. The process of mechanically producing a finely divided catalyzer metal from the pure metal by abrasion in an atmosphere of hydrogen gas.

27. The process of forming a catalyzer by producing finely divided metal by abrading a pure metal in the presence of a material to be hydrogenated and in the presence of hydrogen.

28. The process of obtaining a finely divided metal catalyzer by abrading a pure metal in an atmosphere of hydrogen and in a flow of heated oil.

29. The process of forming a catalyzer by abrading a catalyzer metal in the presence of heated oil.

30. The process of forming a catalyzer by abrading a catalyzer metal in the presence of a material to be acted upon by the catalyzer so formed.

In testimony whereof I have hereunto subscribed my name in the presence of two subscribing witnesses.

BENJAMIN W. ELDER.

Witnesses:
A. WIGHTMAN,
F. N. CHAFLIN.